Aug. 18, 1931.  A. MOORHOUSE  1,819,110
MOTOR VEHICLE AXLE
Filed April 29, 1920
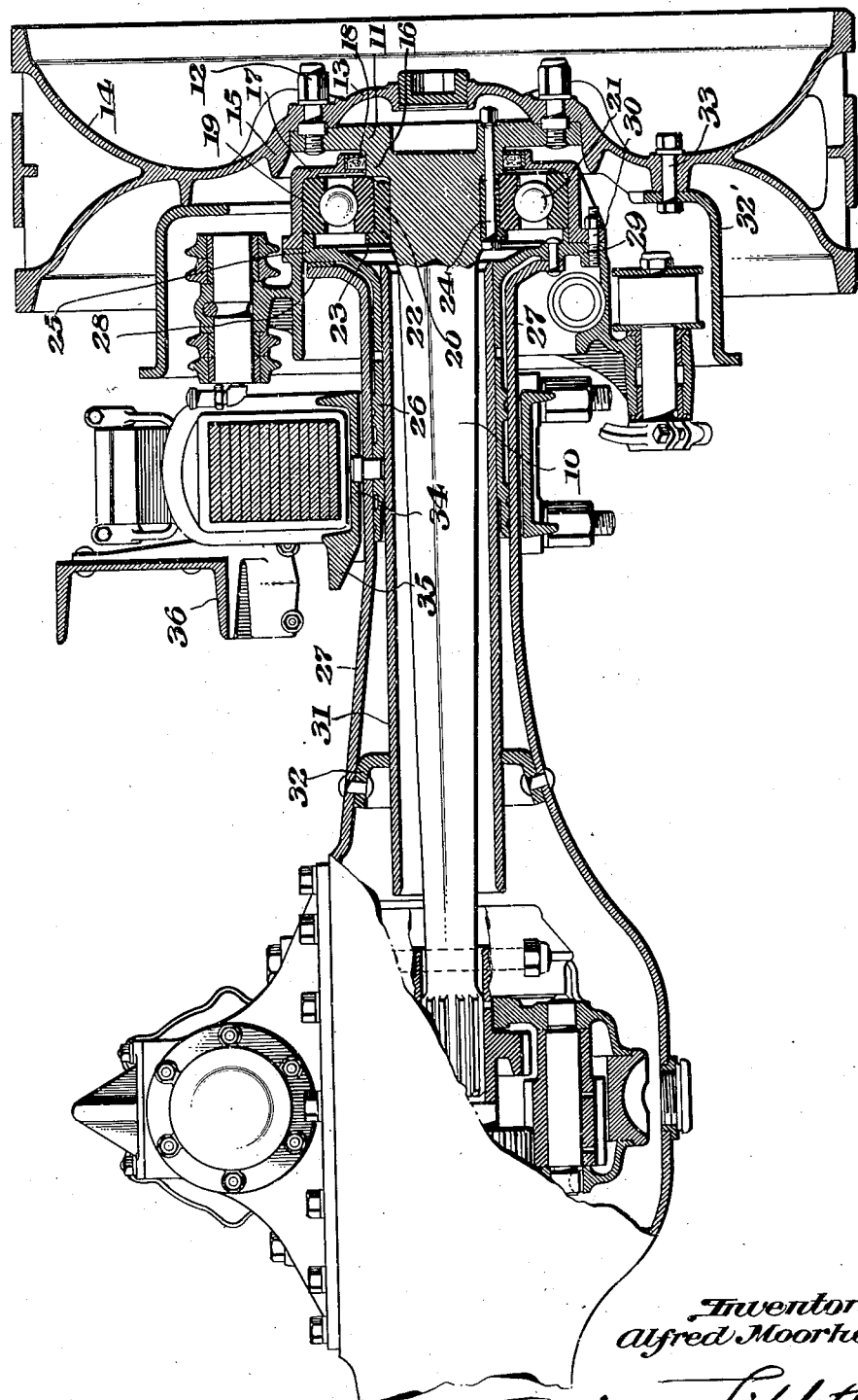
Inventor,
Alfred Moorhouse,
By Milton Sittiti Atty.

Patented Aug. 18, 1931

1,819,110

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE AXLE

Application filed April 29, 1920. Serial No. 377,559.

This invention relates to motor vehicles and particularly to the axles thereof.

The principal object of the invention is to enable the wheel, brake drum and axle shaft to be removed from the fixed axle housing without necessitating the removal of the bearings or disturbing the alignment of such parts. Particularly is it an object of the invention to enable such result to be accomplished in connection with axles of the three quarters floating type.

Another object of the invention is to improve and simplify the construction of the rear axle assembly.

Another object of the invention is to provide means for preventing contact of the frame with the axle housing should the frame be carried down beyond the sustaining power of the springs.

With these objects in view, the invention is embodied in preferable form in the construction and arrangement hereinafter described and illustrated in the accompanying drawing, in which the view shown is a longitudinal sectional view of one end of the rear axle, showing the wheel mounted thereon.

Referring to the drawing, 10 indicates one of the rear axle shafts having at its extreme outer end a flange 11 to which is secured by means of rivet head bolts 12, the hub 13, of a wheel 14. The wheel hub is provided with an inwardly projecting annular tapered flange 15, adapted to center the wheel with respect to the axle as the wheel is slipped over the end of the latter.

Within the flange 11 the axle is provided with a similar annular step flange 16, against the face of which bears the inner edge of an annular radially extending portion of a cage or retainer member 17, which portion is provided with a recess in which is held a flexible packing 18, adapted to bear against the surface of the step flange of the axle in order to exclude dust and dirt from the bearings. 19 is an outer bearing ring between which and an inner complementary bearing ring 20 are mounted anti-friction members, such as balls 21. The outer part of the radial portion of the member 17 serves to retain the outer ring against outward displacement. The inner bearing member is mounted upon an annular retainer member 22, having a radial flange 23 which extends over a part of the inner face of the bearing ring 20. This retainer is rigidly secured to the axle 10 by means of bolts 24, which extend through the flange 11, and are secured by nuts on the outside of such flange. The ring 20 bears at its outer face against the flange 16.

25 indicates the inner retaining element for the outer bearing ring, and it is formed as a flange of a cylindrical sleeve 26, mounted within the axle housing 27, through which the axle shaft is adapted to extend longitudinally. This axle housing also has a radial flange 28 at its end, which is secured to the flange 25 by suitable rivets or bolts, appropriate packing being also interposed between said flanges. The flange of the sleeve is extended radially at 29 to provide an extension, forming part of the brake operating assembly, and bolts 30 secure said extension to the outer bearing retainer 17.

A stiffener tube 31 surrounds the axle and bears against the sleeve 26, and is centered by means of a flanged spacing ring 32, secured to the axle housing. This tube serves to stiffen the axle housing assembly.

A brake drum 32' is secured to the hub 13 of the wheel by means of bolts 33.

It will be seen that the wheel and the brake drum constitute one assembly, the axle another, and the bearings, retainers 17 and 25, and axle housing 27, another assembly. With this arrangement, both the wheel and the axle shaft may be removed from their mountings without removing the bearings or disturbing the alignment thereof. To effect this operation, the outer nuts on the bolts 12 are removed which permits the removal of the wheel together with the brake drum 32'. If it is desired to remove also the axle shaft, then, after the withdrawal of the wheel, the outer nut of the bolt 24 is removed so as to release the shaft from the parts connected to the bearing assembly and then the axle shaft may be withdrawn, leaving the bearings in their assembly with their correct alignment preserved.

Secured to the axle housing is a spring trunnion 34, from which an extension 35 projects laterally, providing an abutment which is adapted to receive the contact of the frame 36 when the latter is carried down beyond the limit of support by the spring. The axle is thus protected from injury by the frame.

Having thus described my invention what I claim is:

1. In a motor vehicle axle construction, in combination, an axle housing, an axle bearing positioned within the outer end of the housing, said bearing having inner and outer races and the outer race being retained by the housing against movement axially thereof, a shaft extending axially of the housing, the inner end of which is driven and the outer end of which is supported by said bearing and projects from the housing and is provided with a portion to which a wheel may be detachably secured, said shaft also having a portion adapted to serve as an outboard abutment for the inner bearing race, a retaining device mounted on the shaft and having a portion adapted to engage the inboard side of the inner bearing race, and means accessible from the outer end of the axle extending to and operatively engaging said retainer whereby said retainer and shaft may be relatively adjusted axially of the housing and caused to rigidly secure the inner bearing race to the shaft so that the shaft is held by the bearing against axial outward movement relatively to the housing, said last mentioned means being releasable to permit withdrawal of the shaft from the housing without removal or displacement of the bearing.

2. In a motor vehicle axle construction, in combination, an axle housing, an axle bearing positioned within the outer end of the housing, said bearing having inner and outer races and the outer race being retained by the housing against movement axially thereof, a shaft extending axially of the housing, the inner end of which is driven and the outer end of which is supported by said bearing and projects from the housing and is provided with a portion to which a wheel may be detachably secured, said shaft also having an annular abutment adapted to engage the inner bearing race on its outboard side, a retaining device encircling the shaft and adapted to engage the inboard side of the inner bearing race, and a bolt carried by the shaft, said bolt being accessible from the outer end of the axle and extending to and operatively engaging said retainer whereby said retainer and shaft may be relatively adjusted axially of the housing and caused to clamp and rigidly secure the inner bearing race to the shaft so that the shaft is held by the bearing against axial outward movement relatively to the housing, said bolt being releasable to permit withdrawal of the shaft independently of the bearing and retainer.

In testimony whereof I affix my signature.

ALFRED MOORHOUSE.